April 1, 1969   R. L. GENZ ETAL   3,435,615
SPEED REGULATOR FOR HYDROSTATIC TRANSMISSIONS
Filed Oct. 20, 1967
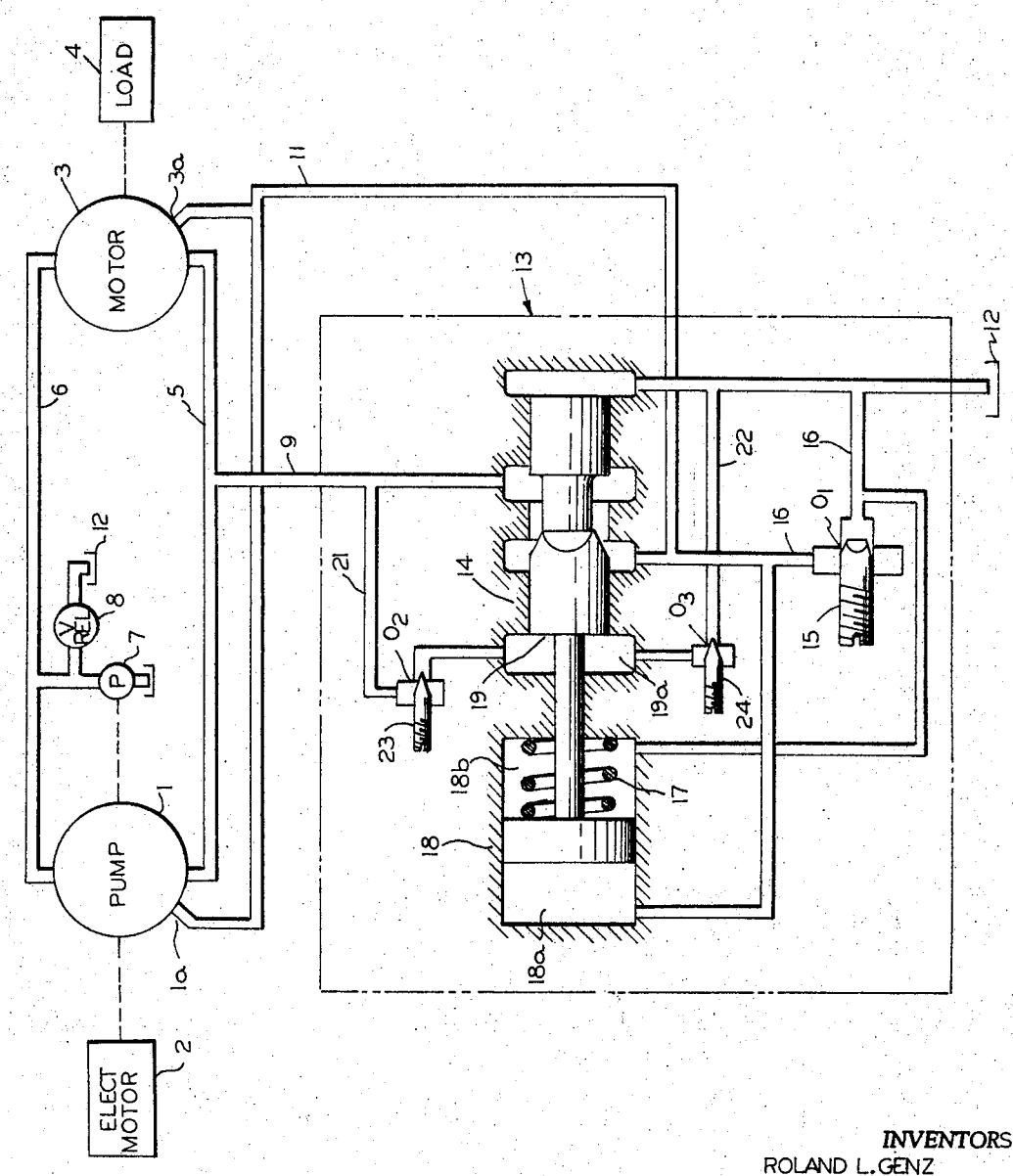
INVENTORS
ROLAND L. GENZ
SAMUEL G. WILLIAMS
BY
ATTORNEYS United States Patent Office 3,435,615
Patented Apr. 1, 1969

3,435,615
SPEED REGULATOR FOR HYDROSTATIC TRANSMISSIONS
Roland L. Genz, Portage, and Samuel G. Williams, Kalamazoo, Mich., assignor to General Signal Corporation, a corporation of New York
Filed Oct. 20, 1967, Ser. No. 676,909
Int. Cl. F16h 39/50
U.S. Cl. 60—53                                                  4 Claims

ABSTRACT OF THE DISCLOSURE

A regulating scheme for reducing variations in the output speed of a hydrostatic transmission of the type employing fixed displacement pump and motor units. The scheme comprises a bleed conduit leading from the high pressure side of the transmission circuit to a reservoir and containing a throttling valve, a drain conduit connecting the case drains of the pump and motor with the reservoir, and a control for positioning the throttling valve in accordance with both the pressure in said high pressure side and the sum of the flow rates through the bleed and drain conduits.

Background of the invention

The present invention relates to hydrostatic transmissions employing fixed displacement pump and motor unit, and is particularly concerned with minimizing changes in the output speed of the motor under variable loading conditions.

While their simplicity and relatively low cost make transmissions of this type attractive, utility is limited because the output speed of the motor changes substantially with the magnitude of the load imposed on it. In general, the speed variation is attributable to the compressibility of the hydraulic oil, and to the fact that the internal leakage of the motor and pump units varies with pressure. In a typical transmission designed to operate with a nominal flow rate of 30 gallons per minute (g.p.m.) and handle pressures up to 3000 p.s.i., the effective flow loss attributable to these two factors is on the order of 1 to 2 g.p.m. per 1000 p.s.i. Therefore, over the normal loading range of 400 to 3000 p.s.i., the output speed will change 10% to 20%. If the pump is driven by an electric motor, the speed variation is even greater because the speed droop characteristic of the electric motor can account for an additional flow loss of 0.2 to 0.4 g.p.m. per 1000 p.s.i. Obviously, this poor performance renders the fixed displacement type of hydrostatic transmission unsuitable for uses, such as machine tool drives, where a relatively constant speed under variable loading conditions is required.

Summary of the invention

The object of this invention is to provide a speed-regulating scheme for hydrostatic transmissions of the fixed displacement type which materially reduces the changes in output speed attributable to variations in the load. In accordance with the invention, the transmission is provided with a bleed conduit which leads from the high pressure side of the transmission circuit to a reservoir and which contains a throttling valve, a drain conduit which connects the case drains of the pump and motor with the reservoir, and an automatic control for positioning the throttling valve. The control includes one portion which responds to the sum of the flow rates through the bleed and drain conduits, and which tends to position the throttling valve as required to maintain this sum substantially constant. While this portion of the control, by itself, affords some speed-regulating action, it does not compensate for interport leakage within the pump and motor which, of course, is not reflected in the drain leakage, for compressibility effects, or for the speed droop characteristic of the prime mover used to drive the pump. These factors are compensated by a second portion of the control which responds to the pressure in the high pressure side of the transmission circuit and which is arranged to supplement the corrective action initiated by the flow rate responsive control. The second control portion reduces the flow rate which the first control tends to maintain by an amount which varies with the effective flow losses attributable to compressibility, speed droop and interport leakage. The joint action of the two control portions maintains substantially constant the rate of flow through the motor of work-performing fluid. Therefore, motor speed is rendered substantially independent of load. With proper adjustment of the control portions, motor speed variations can be kept within 2% to 5% of the minimum speed.

Description of the preferred embodiment

The preferred embodiment of the invention is described herein with reference to the accompanying drawing whose single figure is a schematic diagram of the improved transmission.

Referring to the drawing, the transmission comprises a hydraulic pump 1 which is driven by an electric motor 2, a hydraulic motor 3 which drives a load 4, and a pair of main conduits 5 and 6 which connect the pump and motor in a closed transmission circuit. The pump and motor are of the fixed displacement type, which will be understood to mean either that each has no displacement-varying element or that such an element is included but is held in a fixed position. It is assumed that pump 1 discharges to main conduit 5, so this conduit defines the high pressure side of the circuit and conduit 6 defines the low pressure side. The circuit is maintained liquid-filled by a charge pump 7 driven by motor 2, and the pressure in the low pressure side 6 is limited by a relief valve 8. A conventional high pressure relief valve (not shown) limits the pressure in main conduit 5.

The high pressure side of the circuit and the case drains 1a and 3a of the two hydraulic units are connected with bleed and drain conduits 9 and 11, respectively, which lead to a reservoir 12 through a speed-regulating device 13. This device includes a spool type throttling valve 14 which is interposed in bleed conduit 9, and a needle valve 15 which defines a main metering orifice $O_1$ of variable flow area in a common conduit 16 connecting bleed and drain conduits 9 and 11 with reservoir 12. Throttle valve 14 is biased by spring 17 toward a minimum flow-restricting position and is shifted in the opposite direction by a pair of fluid pressure motors 18 and 19. Motor 18 is of the double-acting type, and its opposed working spaces 18a and 18b are connected with common conduit 16 at opposite sides of the main orifice $O_1$. Therefore, this motor exerts on throttle valve 14 a shifting force that varies with the sum of the flow rates through conduits 9 and 11. Motor 19, on the other hand, is of the single-acting type, and its working space 19a is connected with main conduit 5 through passage 21 and bleed conduit 9, and also with reservoir 12 through passage 22 and common conduit 16. A pair of needle valves 23 and 24 define auxiliary metering orifices $O_2$ and $O_3$, respectively, in the passages 21 and 22. The needle valves are so adjusted that the pressure in working space 19a varies with the pressure in main conduit 5. Therefore, it follows that the shifting force exerted by motor 19 also varies with the load pressure.

Before the transmission is first put in service, needle valves 23 and 24 are closed and opened, respectively, in order to vent working space 19a to reservoir 12 and thereby render motor 19 ineffective. Main needle valve 15 is then adjusted so that motor 18 causes valve 14 to throttle the flow through conduit 9 to a fixed, fairly low rate under no load conditions. In a system wherein the nomial output of pump 1 is about 30 g.p.m. and load pressures vary between 400 and 3000 p.s.i., the flow area of orifice $O_1$ should be set initially to establish in conduit 16 a flow rate on the order of 6 g.p.m. After needle valve 15 has been set, the transmission is operated over the full range of loading conditions which will be encountered in service, and the variations in the output speed of motor 3 are noted. This information indicates the amount of corrective action which motor 19 must provide and serves as a guide in choosing the initial trial settings of needle valves 23 and 24. With motor 3 unloaded, needle valves 23 and 24 are now opened and closed, respectively, to raise the pressure in working space 19a to an appropriate fraction of the pressure in main conduit 5. Then the transmission is again subjected to the design range of loading conditions in order to determine the effectiveness of the pressure responsive portion of control device 13. It is unlikely, at least in the absence of considerable experience with the improved transmission, that the initial settings of valves 23 and 24 will be the optimum settings. Therefore, it probably will be necessary to run additional tests at different settings in order to find those that give the desired degree of speed regulation.

After control device 13 has been adjusted, the transmission is ready for service. When it is operated under no load conditions, the pressure in main conduit 5 will be a minimum, and consequently motor 19 will exert a minimal shifting force on throttle valve 14. Therefore, valve 14 will be positioned primarily by motor 18 which responds to the flow rate through common conduit 16. Since the flow rate through drain conduit 11 will be quite low, valve 14 will assume a position in which it establishes a maximum flow rate through bleed conduit 9.

As the load increases, so too does the pressure in conduit 5. One effect of this is an increase in the drain leakage at both the pump 1 and the motor 3. As the rate of flow through drain conduit 11 rises, the pressure differential across orifice $O_1$ increases, and motor 18 shifts valve 14 to the right to throttle the direct bleed from the transmission circuit. The throttling action of valve 14 reduces the flow rate through conduit 9 an amount approximately equal to the increase in the flow rate through conduit 11. Therefore, the effect of the increase in drain leakage on the rate of flow of work-performing fluid through motor 3 is substantially compensated. As a result, motor speed is rendered substantially independent of drain leakage.

The increase in the load pressure in the transmission circuit also increases interport leakage within pump 1 and motor 3, reduces the speed of electric motor 2, and compresses the oil in the high pressure side of the closed transmission circuit. These changes, which also tend to reduce the rate of flow of work-producing oil through motor 3, are compensated by the pressure responsive portion of control device 13. As the pressure in main conduit 5 rises, the pressure in working space 19a and the shifting force exerted by motor 19 also increase. Since motor 19 acts on valve 14 in aid of motor 18, the valve will throttle the flow through bleed conduit 9 slightly more than required merely to offset the increase in the rate of flow through drain conduit 11. This means that, as the load pressure rises, control device 13 reduces progressively the total rate of flow through common conduit 16. If the orifices $O_2$ and $O_3$ are properly set initially, this programmed reduction in flow through conduit 16 will substantially match the increase in effective flow loss attributable to interport leakage, compressibility and electric motor speed droop over the entire loading range. As a result, the output speed of motor 3 will remain substantially constant.

When the load imposed on motor 3 is decreased, both the pressure in conduit 5 and the rate of flow through drain conduit 11 decrease. These changes reduce the shifting forces exerted by motors 18 and 19; therefore, spring 17 now moves valve 14 to the left to decrease the restriction to flow through bleed conduit 9. As a result, the rate of flow through this conduit increases. This has the effect of offsetting the reductions in the effective and actual flow losses and of maintaining the working flow rate through motor 3 essentially constant.

While we have described in detail one embodiment of our inventive concept, it should be understood that the following claims provide the true measure of the scope of the invention.

We claim:
1. In combination
   (a) a hydrostatic transmission including a pump (1) and a motor (3) connected in a closed circuit having high and low pressure sides (5, 6) and each having a case drain (1a or 3a);
   (b) a fluid reservoir (12);
   (c) a bleed conduit (9) leading from said high pressure side (5) to the reservoir (12) and containing a throttling valve (14), and a drain conduit (11) leading from the case drains (1a, 3a) to the reservoir; and
   (d) control means (13) responsive to both the pressure in said high pressure side (5) and the sum of the flow rates through the bleed and drain conduits (9, 11) for positioning the throttling valve (14) so as to vary its throttling action directly in accordance with these quantities.

2. The combination defined in claim 1 in which the control means includes
   (a) a metering orifice ($O_1$) located in a common conduit (16) which connects the bleed and drain conduits (9, 11) with the reservoir (12); and
   (b) a fluid pressure motor (18) having opposed working spaces (18a, 18b) connected with the common conduit (16) at points on opposite sides of the metering orifice ($O_1$) and arranged to shift the throttling valve (14).

3. The combination defined in claim 2 in which the control means also includes
   (a) a second fluid pressure motor (19) acting on the throttling valve (14) in aid of the first such motor (18); and
   (b) a pair of passages (21, 22) connecting the second motor with said high pressure side (5) and the reservoir (12), respectively, and each containing a metering orifice ($O_2$ or $O_3$).

4. The combination defined in claim 3 in which all three metering orifices ($O_1$, $O_2$, $O_3$) are of the variable type.

References Cited
UNITED STATES PATENTS

| | | | |
|---|---|---|---|
| 2,005,731 | 6/1935 | Ernst et al. | 60—52 |
| 2,255,783 | 9/1941 | Kendrick | 60—53 |
| 2,255,787 | 9/1941 | Kendrick | 60—53 X |
| 2,961,829 | 11/1960 | Weisenbach | 60—53 |

EDGAR W. GEOGHEGAN, *Primary Examiner.*